(12) United States Patent
Czaja et al.

(10) Patent No.: US 8,223,683 B2
(45) Date of Patent: *Jul. 17, 2012

(54) AUTOMATIC PROVISIONING OF FEMTOCELL

(75) Inventors: Stanislaw Czaja, Cardiff, CA (US); Mark E. Davis, Carlsbad, CA (US); Anthony Lee, San Diego, CA (US); Sang Gook Kim, San Diego, CA (US); Li-Hsiang Sun, San Diego, CA (US)

(73) Assignees: VIA Telecom, Inc, San Diego, CA (US); IPComm, Cardiff, CA (US); LG Electronics, Inc., Seoul (KR)

( * ) Notice: Subject to any disclaimer, the term of this patent is extended or adjusted under 35 U.S.C. 154(b) by 865 days.

This patent is subject to a terminal disclaimer.

(21) Appl. No.: 12/123,767

(22) Filed: May 20, 2008

(65) Prior Publication Data

US 2009/0092096 A1    Apr. 9, 2009

Related U.S. Application Data

(60) Provisional application No. 60/977,652, filed on Oct. 5, 2007.

(51) Int. Cl.
*H04B 7/14* (2006.01)
*H04W 4/00* (2009.01)
*H04W 40/16* (2009.01)

(52) U.S. Cl. ......... 370/315; 370/332; 370/338; 455/448

(58) Field of Classification Search .......... 370/310–350; 455/422.1, 446–454, 63.1–69, 432.1–444, 455/456.1–456.3

See application file for complete search history.

(56) References Cited

U.S. PATENT DOCUMENTS

| | | | |
|---|---|---|---|
| 5,508,708 | A | 4/1996 | Ghosh et al. |
| 5,920,554 | A | 7/1999 | Nakamura et al. |
| 6,049,596 | A | 4/2000 | Dumaine et al. |
| 6,141,565 | A | 10/2000 | Feuerstein et al. |
| 6,246,673 | B1 | 6/2001 | Tiedemann, Jr. et al. |
| 6,526,039 | B1 | 2/2003 | Dahlman et al. |

(Continued)

FOREIGN PATENT DOCUMENTS

CN    1229563    9/1999

(Continued)

OTHER PUBLICATIONS

"Position Determination Service Standard for Dual Mode Spread Spectrum Systems." 3rd Generation Partnership Project 2 "3GPP2". 3GPPS C.S0022-0 Version 3.0, Feb. 16, 2001. pp. 1-146.

(Continued)

*Primary Examiner* — Tri H Phan
(74) *Attorney, Agent, or Firm* — Richard K. Huffman; James W. Huffman

(57) ABSTRACT

Automatic provisioning of an access point base station or femtocell. The method may include the femtocell transmitting first information (e.g., location information, signal measurement information, capability information, etc.) to a service provider (e.g., over an IP network). The femtocell may receive second information from the service provider, where the second information includes one or more operational parameters. The operational parameters may include hand-off parameters, admission policy information, PN or scrambling codes, power parameters, and/or other parameters. The femtocell may operate according to the received parameters to provide access for a plurality of access terminals in a local area.

21 Claims, 10 Drawing Sheets

U.S. PATENT DOCUMENTS

| | | | |
|---|---|---|---|
| 6,711,149 B1 | 3/2004 | Yano et al. | |
| 6,775,318 B2 | 8/2004 | Chen et al. | |
| 6,829,534 B2 | 12/2004 | Fuchs et al. | |
| RE38,808 E | 10/2005 | Schuchman et al. | |
| 6,975,988 B1 | 12/2005 | Roth et al. | |
| 7,064,709 B1 | 6/2006 | Weisenburger et al. | |
| 7,289,473 B1 | 10/2007 | Padovani et al. | |
| 7,388,838 B2 | 6/2008 | Abraham et al. | |
| 7,423,994 B2 | 9/2008 | Liu et al. | |
| 7,500,119 B2 * | 3/2009 | Tsai | 713/300 |
| 7,509,124 B2 * | 3/2009 | O'Neil | 455/432.2 |
| 7,551,930 B2 | 6/2009 | Lempio et al. | |
| 7,613,444 B2 | 11/2009 | Lindqvist et al. | |
| 7,664,492 B1 | 2/2010 | Lee et al. | |
| 7,756,531 B2 | 7/2010 | Aminzadeh | |
| 7,768,983 B2 | 8/2010 | Nylander et al. | |
| 7,817,997 B2 | 10/2010 | Nylander et al. | |
| 7,830,847 B1 | 11/2010 | Sill et al. | |
| 8,089,400 B1 * | 1/2012 | Fang et al. | 342/357.42 |
| 2002/0049058 A1 | 4/2002 | Tee | |
| 2002/0187792 A1 | 12/2002 | Kato et al. | |
| 2003/0202564 A1 | 10/2003 | Ho et al. | |
| 2004/0057468 A1 | 3/2004 | Shieh et al. | |
| 2004/0165528 A1 | 8/2004 | Li et al. | |
| 2004/0170221 A1 | 9/2004 | Storm et al. | |
| 2004/0205158 A1 | 10/2004 | Hsu | |
| 2005/0192024 A1 | 9/2005 | Sheynblat | |
| 2006/0166671 A1 | 7/2006 | Rajkotia et al. | |
| 2006/0274743 A1 * | 12/2006 | Yegin et al. | 370/389 |
| 2006/0276201 A1 | 12/2006 | Dupray | |
| 2007/0105568 A1 * | 5/2007 | Nylander et al. | 455/458 |
| 2007/0183427 A1 | 8/2007 | Nylander et al. | |
| 2007/0258395 A1 | 11/2007 | Jollota et al. | |
| 2008/0076392 A1 | 3/2008 | Khetawat et al. | |
| 2008/0076398 A1 | 3/2008 | Mate et al. | |
| 2008/0096527 A1 | 4/2008 | Lamba et al. | |
| 2008/0130596 A1 | 6/2008 | Kalhan | |
| 2008/0188265 A1 | 8/2008 | Carter et al. | |
| 2008/0244148 A1 | 10/2008 | Nix, Jr. et al. | |
| 2008/0287153 A1 | 11/2008 | Fullam | |
| 2009/0029645 A1 | 1/2009 | Leroudier | |
| 2009/0034482 A1 | 2/2009 | Hahm et al. | |
| 2009/0042536 A1 * | 2/2009 | Bernard et al. | 455/406 |
| 2009/0052395 A1 * | 2/2009 | Bao et al. | 370/331 |
| 2009/0061892 A1 | 3/2009 | Lee et al. | |
| 2009/0082010 A1 | 3/2009 | Lee et al. | |
| 2009/0092078 A1 | 4/2009 | Czaja et al. | |
| 2009/0092097 A1 * | 4/2009 | Nylander et al. | 370/331 |
| 2009/0092122 A1 | 4/2009 | Czaja et al. | |
| 2009/0093246 A1 | 4/2009 | Czaja et al. | |
| 2009/0093252 A1 | 4/2009 | Czaja et al. | |
| 2009/0098873 A1 * | 4/2009 | Gogic | 455/436 |
| 2009/0135758 A1 * | 5/2009 | Alper et al. | 370/328 |
| 2009/0298475 A1 | 12/2009 | Czaja et al. | |
| 2009/0298515 A1 | 12/2009 | Czaja et al. | |
| 2010/0184421 A1 * | 7/2010 | Lindqvist et al. | 455/418 |

FOREIGN PATENT DOCUMENTS

| | | |
|---|---|---|
| CN | 1783822 | 6/2006 |
| CN | 1894979 A | 1/2007 |
| WO | WO2007016499 | 2/2007 |

OTHER PUBLICATIONS

Claussen, Holger et al. "Performance of Macro- and Co-Channel Femtocells in a Hierarchical Cell Structure." The 185h Annual IEEE International Symposium on Personal,. Indoor and Mobile Radio Communications (PIMRC'07). 2007 IEEE pp. 1-5.

* cited by examiner

AUTOMATIC PROVISIONING OF FEMTOCELL

PRIORITY INFORMATION

This application claims benefit of priority of U.S. provisional application Ser. No. 60/977,652 titled "Integrating the Femto-Cell by Automatic Provisioning" filed Oct. 5, 2007, whose inventors are Stash Czaja, Anthony S. Lee, and Mark Davis, which is hereby incorporated by reference in its entirety as though fully and completely set forth herein.

FIELD OF THE INVENTION

The present invention relates to the field of cellular networks, and more particularly to automatic provisioning of a femtocell base station.

DESCRIPTION OF THE RELATED ART

In recent years, the use of mobile devices and, in particular, cellular telephones has proliferated. As a result, focus on reception for cellular telephones or other mobile devices, especially in homes or primary residences, has increased. Additionally, typical users of mobile devices use or subscribe to data services for their homes. As a result, femtocells (more generally called access point base stations) have begun to be used in the home. Femtocells provide cellular service to mobile devices using the data service of the user. Thus, these femtocells provide excellent service where mobile devices are used most and typically make use of data plan services (e.g., DSL, fiberoptic, cable, WiMAX, etc.), which may not require a nearby macro cell of the cell phone service provider. However, femtocells typically require manual set up, e.g., by a technician, in order to operate efficiently. Thus, improvements in installation of femtocells would be desirable.

SUMMARY OF THE INVENTION

Various embodiments are presented of a method for automatically provisioning an access point base station (e.g., a femtocell).

Various embodiments are presented of a method for automatically provisioning an access point base station (e.g., a femtocell) to reduce interference of the access point base station.

The access point base station may provide wireless communication in a wireless area while a service provider (e.g., via a macro base station) may provide wireless communication in a macro area. The access point base station may include an interface with one or more wired or wireless ports for coupling to a wide area network and/or to access terminals (e.g., mobile devices). Additionally, the access point base station may include one or more processors and memory to implement various ones of the processes described below.

The access point base station may provide wireless communication in a local area. In some embodiments, the access point base station may perform one or more measurements, e.g., of signals (e.g., signal strength) provided by the one or more access terminals.

The access point base station may connect to the service provider through a wired connection (e.g., an IP connection over a wide area network) and transmit first information. The first information may include location information, capability information, the measurement information, and/or other information of the access point base station. The capability information may include propagation characteristics of the environment in which the access point base station is located. The access point base station may sent an activation request message (ARM) followed by the first information to the service provider.

In response, the access point base station receiving second information (e.g., in the form of or in addition to an assignment message) from the service provider. The second information may include one or more operational or provisioning parameters which may be determined based on the first information provided by the access point base station. In one embodiment, the plurality of parameters may include at least one handoff parameter. The at least one handoff parameter may include a macro to access point base station drop threshold and an access point base station to macro drop threshold. In some embodiments, the second information and/or the handoff parameter(s) may include hysteresis information. The handoff parameters/hysteresis information may be determined or provided regardless of the location of the access point base station within the macro coverage area. The handoff parameter(s) may be determined based on the location information, the capability information, and/or the measurement information.

Alternatively, or additionally, the plurality of parameters may include power parameters, such as a maximum power transmit parameter. The maximum power transmit parameter may define a coverage area (e.g., the local area) of the access point base station. In some embodiments, the power parameters (e.g., the maximum transmit power parameter) may contain information or define power allocation of one or more overhead channels of the access point base station. The power parameters may be determined based on the location information, the capability information, and/or the measurement information, among other information. In some embodiments, the one or more operational parameters (e.g., power transmit parameters or handoff parameters) may be determined based on a coverage area propagation model.

Correspondingly, the access point base station may operate based on the one or more operational parameters. Operating based on the operational parameters may reduce the interference produced by the access point base station and/or may allow for more efficient handoffs between the macro base station and the access point base station.

For example, the access point base station may receive signal strength information from an access terminal moving from the macro area to the local area. When the signal strength information indicates that the signal strength of the access point base station is above the macro to access point base station drop threshold (indicated above), the access point base station may send a handoff request to the service provider. Correspondingly, the handoff request may cause the access terminal to begin using the access point base station (e.g., by removing the macro base station from the active set of the access terminal). Similarly, the access point base station may receive signal strength information from an access terminal moving from the local area to the macro area. When the signal strength information indicates that the signal strength of the macro base station is above the access point base station to macro drop threshold (indicated above), the access point base station may send a handoff request to the service provider. Correspondingly, the handoff request may cause the access terminal to begin using the macro base station (e.g., by removing the access point base station from the active set of the access terminal).

The second information may further include admission policy information may include an admission policy mode specifies one or more of open, restricted, or private access to resources of the access point base station. Additionally, the admission policy information may include a service priority parameter for specifying service priority of a plurality of access terminals. The method may include the access point base station receiving user input specifying a list of access terminals, and the access point base station using the list of access terminals and the admission policy mode to determine access to the access point base station. However, the list of access terminals may be provided in the second information. Alternatively, or additionally, users may enter an access code (e.g., using a first access terminal) to be added to the terminal list (e.g., by the access point base station receiving and storing an identification of the first access terminal in a memory medium) or to receive privileges of an access terminal on the list.

In one embodiment, the access point base station may use the list of access terminals and the associated service priority parameter to determine at least one of: 1) access or 2) access priority to the access point base station. Additionally, or alternatively, operating based on the parameters may include providing access to access terminals based on the parameters (e.g., based on admission policy information).

In one embodiment, where the admission policy mode parameter indicates a private mode, the access point base station may only allow the access terminals on the list to communicate or use resources of the access point base station. In a restricted mode, access terminals on the list may be enabled to communicate with or use the access point base station, e.g., with priority over those access terminals not on the access terminal list.

In response to a change in the network (or possibly changes in admission policies), the access point base station may receive updated operational parameters from the service provider, and correspondingly operate based on the updated operational parameters. The updated parameters may include updated power parameters, handoff parameters, access policy parameters (or modes), etc. Similar to above operating based on the updated operational parameters may reduce interference caused by the access point base station in the changed network and/or provide more efficient handoffs in the changed network. Where the updated parameters involve the admission policy (e.g., the mode or access terminal list), the access point base station may provide access and/or services to access terminals based on this updated information.

Thus, the access point base station may be automatically configured based on first information transmitted by the access point base station.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Terms

Figure 1:
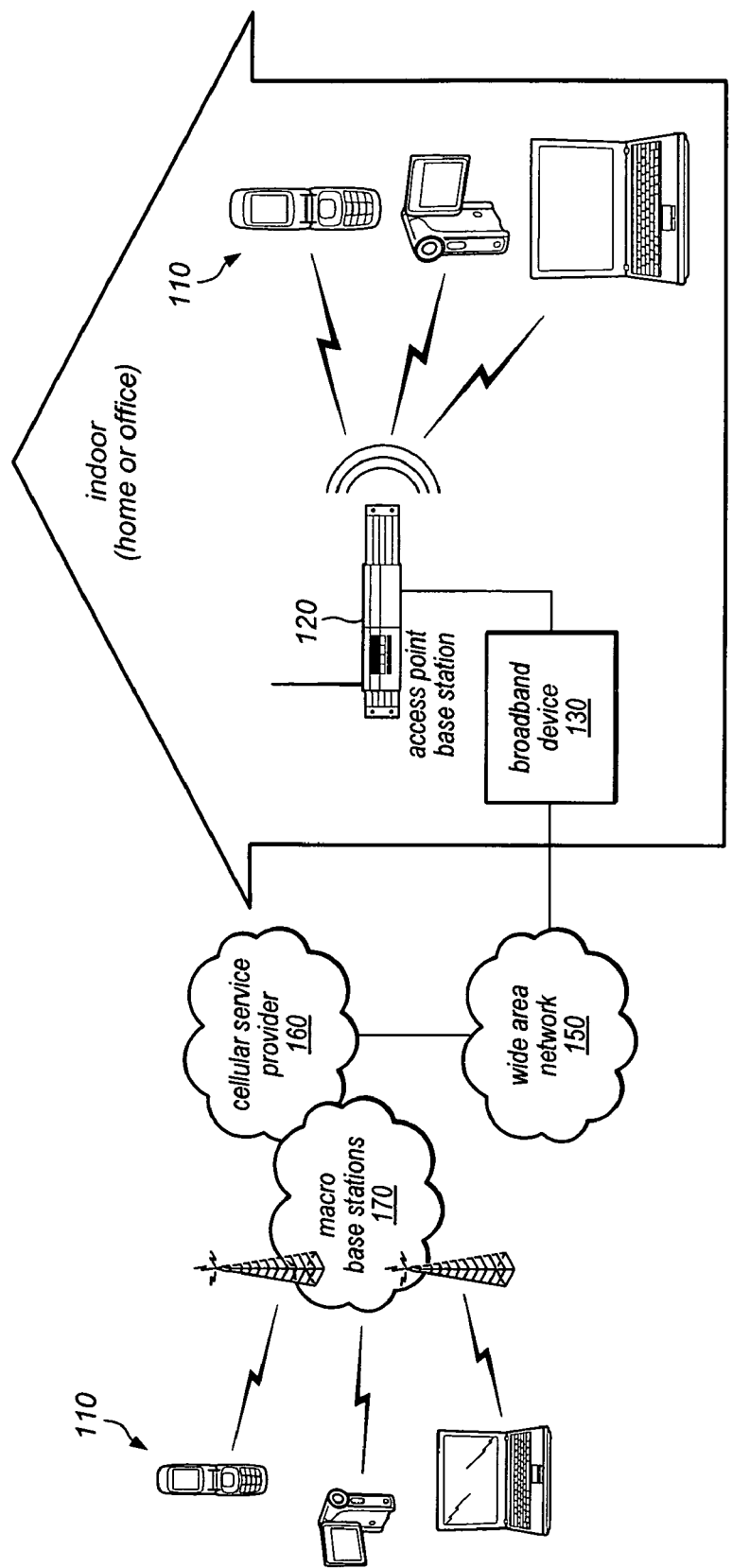
FIG. 1 is an exemplary system including an access point base station according to one embodiment.

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 2:
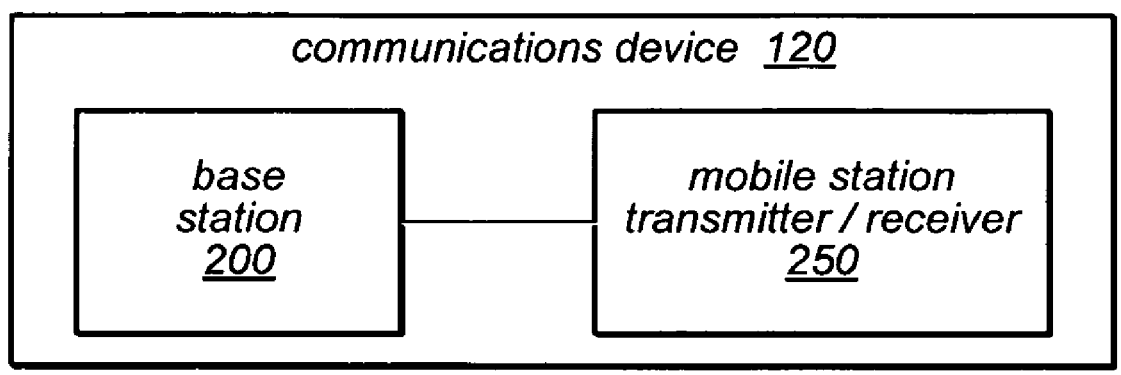
FIG. 2 is an exemplary general block diagram of the access point base station according to one embodiment.

FIGS. 1 and 2—Exemplary Block Diagrams of a Communications System

FIG. 1 illustrates an exemplary system including an access point base station (e.g., a femtocell). The term "access point base station" is intended to include typical definitions (as known by those of skill in the art) of femtocells, home base stations, personal access points (PAPs), and personal 2G-3G (or nG) base stations, among others. In some embodiments, the access point base station may include capabilities of a mobile station transmitter/receiver (transceiver) as well as further functionality described in more detail below. Various embodiments of a method to automatically provision (i.e., setup) the access point base station (e.g., by providing appropriate operational parameters) are presented below.

As shown, FIG. 1 illustrates a home which may include one or more access terminals 110, an access point base station 120, and a broadband device 130. As shown in FIG. 2, the access point base station 120 may include base station circuitry 200 which may be coupled to mobile station transceiver circuitry 250. The base station circuitry 200 and/or the mobile station transceiver circuitry 250 may include or be coupled to a processor (not shown) and memory (not shown) coupled to the processor to implement their functionality. In one embodiment, each of the base station circuitry and the mobile station transceiver circuitry may have independent processors and memory; however, these components may share a processor and memory.

As shown in FIGS. 1 and 2, the base station circuitry 200 and the mobile transceiver circuitry 250 may be included in a same housing of the access point base station 120. The housing may be plastic or metal (e.g., aluminum or other metals) and may take a box-like design. In one embodiment, the housing may include one or more lights or light emitting diodes (LEDs) which indicate the activity or operation of various components of the access point base station 120 (e.g., operation of the base station circuitry 200 and/or the mobile station transceiver circuitry 250, among others).

The housing may include a power supply for providing power to the components of the access point base station 120. The housing may also include one or more ports for coupling to other devices or communications devices. For example, in one embodiment, the housing may include a universal serial bus (USB) port (or other type of port, such as firewire, among others) for attaching devices (e.g., printers, personal music players, personal digital assistants, cell phones, external hard drives, testing devices, media controllers, etc.). Additionally, or alternatively, the one or more ports may include Ethernet ports (e.g., for coupling to a router or the communications device 130, among others), fiber ports, cable ports, etc. In some embodiments, the ports may be implemented as an interface or an interconnection network coupled to the other devices via a wired or wireless connection.

The access point base station 120 may operate to receive wireless communication (e.g., radio frequency (RF) communication) from the one or more access terminals 110 and provide corresponding signals or communication with mobile operator(s) (or cellular service providers) corresponding to the providers of the access terminals 110. More specifically, the access point base station 120 may operate to provide communication for the access terminals 110 using the broadband communications device 130 over an IP wide area network 150 (e.g., the Internet, via the user's internet service provider (ISP)). The broadband device 130 may thus communicate with the cellular service provider 160 via the Internet.

Moreover, the IP wide area network 150 may be private or dedicated to the user using various technologies, for example, lease line, frame relay, digital subscriber line (DSL), or dial-up service. The IP communication may be encrypted or IP tunneling may be used if supported by the IP wide area network 150. The cellular service provider 160 may also be coupled to macro base stations 170 (sometimes referred to as cell phone towers or macro cell stations) which may operate to provide service to the access terminals 110 when outside of range of the access point base station 120 and/or when the access point base station 120 is disabled or non-operational. Thus, the access point base station 120 may provide bi-directional communication for the access terminals via an IP network such as the Internet. Stated another way, users in the home may use their cell phones which communicate with the access point base station, wherein the user's voice communications may be transmitted/received to/from the cellular service provider over an IP network.

The mobile station transceiver circuitry 250 may operate to communicate with the access terminals 110 and the cell towers 170 using wireless cellular communication such as RF. However, it should be noted that in some embodiments, the mobile station transceiver circuitry 250 may not communicate directly with the access terminals 110; instead, it may receive signals from the access terminals 110 via another component, such as the base station 200. The mobile station transceiver circuitry 250 may be used for loopback testing, reporting of environmental factors, and to provide redundancy when the IP network is down, thus improving cellular reception in the home. Thus, in some embodiments, the mobile station transceiver circuitry 250 may be used to monitor environmental factors of the access point base station 120 (e.g., neighboring macro cell stations, neighboring femtocells, radio frequency traffic in the home, etc.) and may convey that information (e.g., to the service provider via the macro cell station or the IP network, as desired) for configuration of the access point base station 120. This information may be critical during initial (e.g., automatic) set up of the access point base station 120. Correspondingly, macro base station 170 and/or the service provider 160 via the wide area network 150 may communicate with the access point base station 120 during installation of the access point base station 120 to perform set-up operations, e.g., automatically. The mobile station transceiver circuitry 250 may also allow for initiation of testing (e.g., loop-back testing) of the access point base station 120, e.g., in response to signals from the macro base station 170.

The access terminals (also referred to as mobile terminals) 110 may include any type of device which may be used in a cellular network, e.g., RF communication. Access terminals 110 may include cellular (or cell) phones (including smart phones), personal digital assistants (PDAs) with mobile communication capabilities, laptops or computer systems with mobile communication components, and/or any device which is operable to communicate with a cellular network. The access terminals may use various different protocols, e.g., cdma2000 (1xRTT and EV-DO), UMB, UMTS, LTE, WiMax, or others). Thus, the access point base station may support any or at least a subset of the protocols used by the access terminals 110, e.g., without modification to the standards or protocols for supporting existing access terminals.

The broadband device 130 may include a router and/or cable/dsl modem for connecting to the wide area network 150. In one embodiment, the broadband device 130 may include a wireless router (or one or more wireless hubs) which may provide wireless communication (e.g., using 802.11x communication technology) for the access point base station 120. Additionally, the broadband device 130 may be connected to the wide area network 150 via wired (e.g., cable, DSL, fiberoptic, power lines, etc.) or wireless means (e.g., WiMAX or other wireless communication methods), as desired. Alternatively, or additionally, the broadband device 130 may be coupled to the access point base station 120 remotely, e.g., via a WiMAX wireless connection. Furthermore, in one embodiment, the access point base station 120 may include the broadband device 130 (e.g., in an all-in-one solution for the user).

Thus, the access point base station 120 may provide access to the cellular network via the wide area network 150 (e.g., the Internet) using the broadband device 130 (wired or wirelessly) and may include the mobile station transceiver 250.

Figure 3:
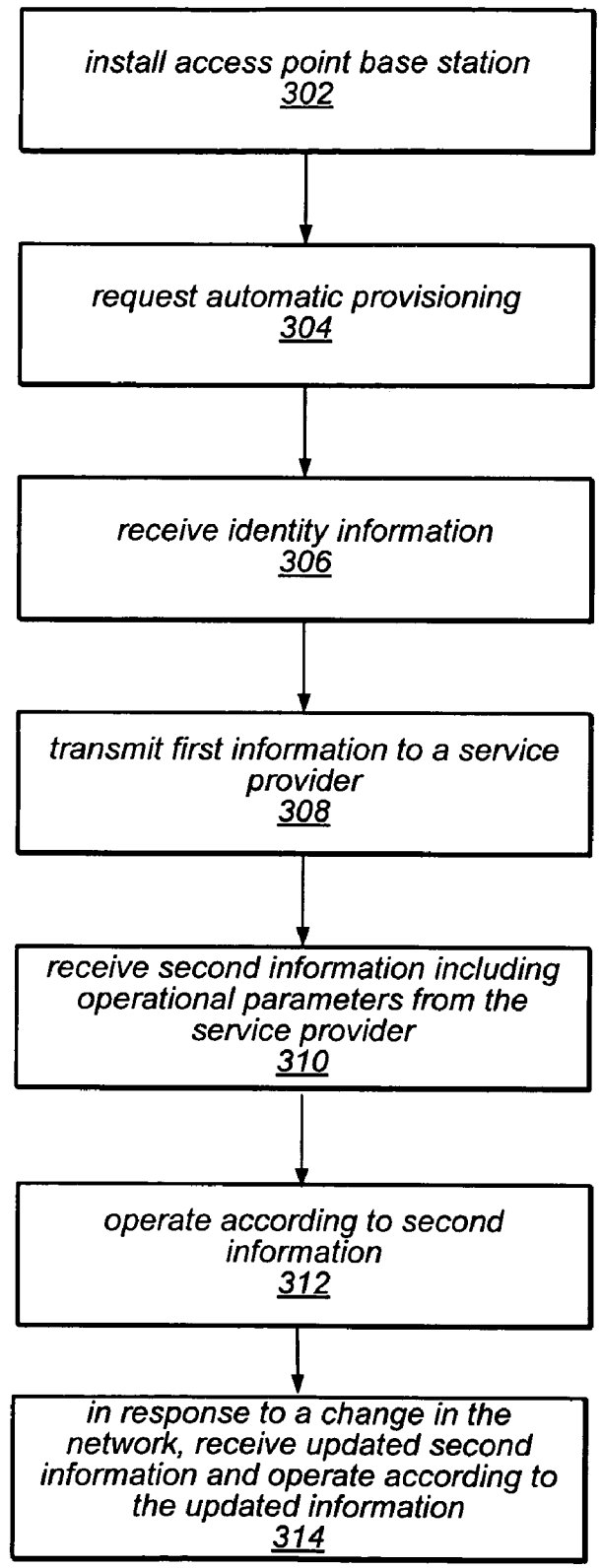
FIG. 3 is a flowchart of an exemplary method for automatically provisioning the access point base station, according to one embodiment.

FIG. 3—Automatic Provisioning of an Access Point Base Station

FIG. 3 illustrates an exemplary method for automatically provisioning an access point base station. The method shown in FIG. 3 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows. In the following description, references to the "access point base station" refer to the access point base station 120.

In 302, the access point base station may be installed, e.g., by a user, possibly in a home. However, installation may occur by a service provider technician or other entity, as desired. Installation of the access point base station may include providing power to the access point base station and coupling the access point base station to a broadband communications device (e.g., using wired or wireless means). In some embodiments, the user may only be required to provide power to the access point base station and couple the access point base station to the broadband device. In other embodiments, further connection settings may be required (e.g., to set up the wireless or network settings of the access point base station). Furthermore, in some embodiments, the access point base station may be installed in a new location by moving the access point base station from an old location. In this example, one or more of the steps described below may not be performed if such information has already been received from a previous installation (e.g., acquiring identification information as in 306).

Figure 4:
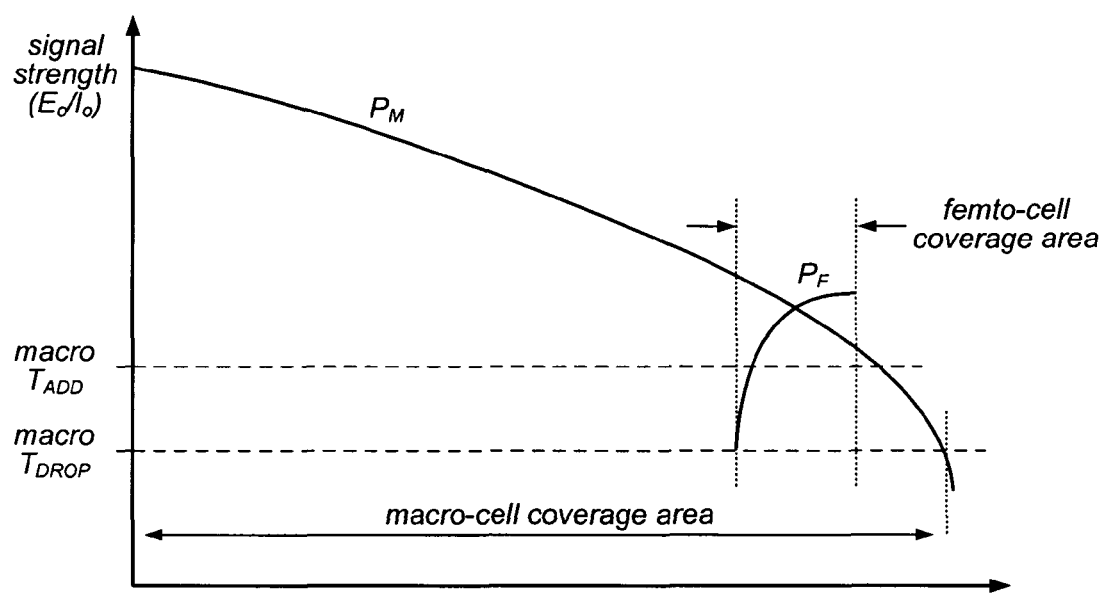
FIG. 4 is a graph illustrating handoff areas for a macro base station and an access point base station, according to one embodiment.

The access point base station may be installed within or near a macro area of a macro cell base station which provides wireless communication in the macro area for the service provider. Thus, the access point base station may provide wireless communication for the service provider within an access point base state coverage area (also referred as local area), possibly inside of or intersected partially with a macro base station coverage area (also referred as macro area) provided by the macro base station. FIG. 4 shows a graph corresponding to this scenario. As shown, the access point base station coverage area is within the macro base station coverage area. The indicated region illustrates where handoffs between the access point base station and the macro base station may occur, e.g., based on signal strength ratios. Further descriptions of the handoff procedures are provided below.

Figure 5:
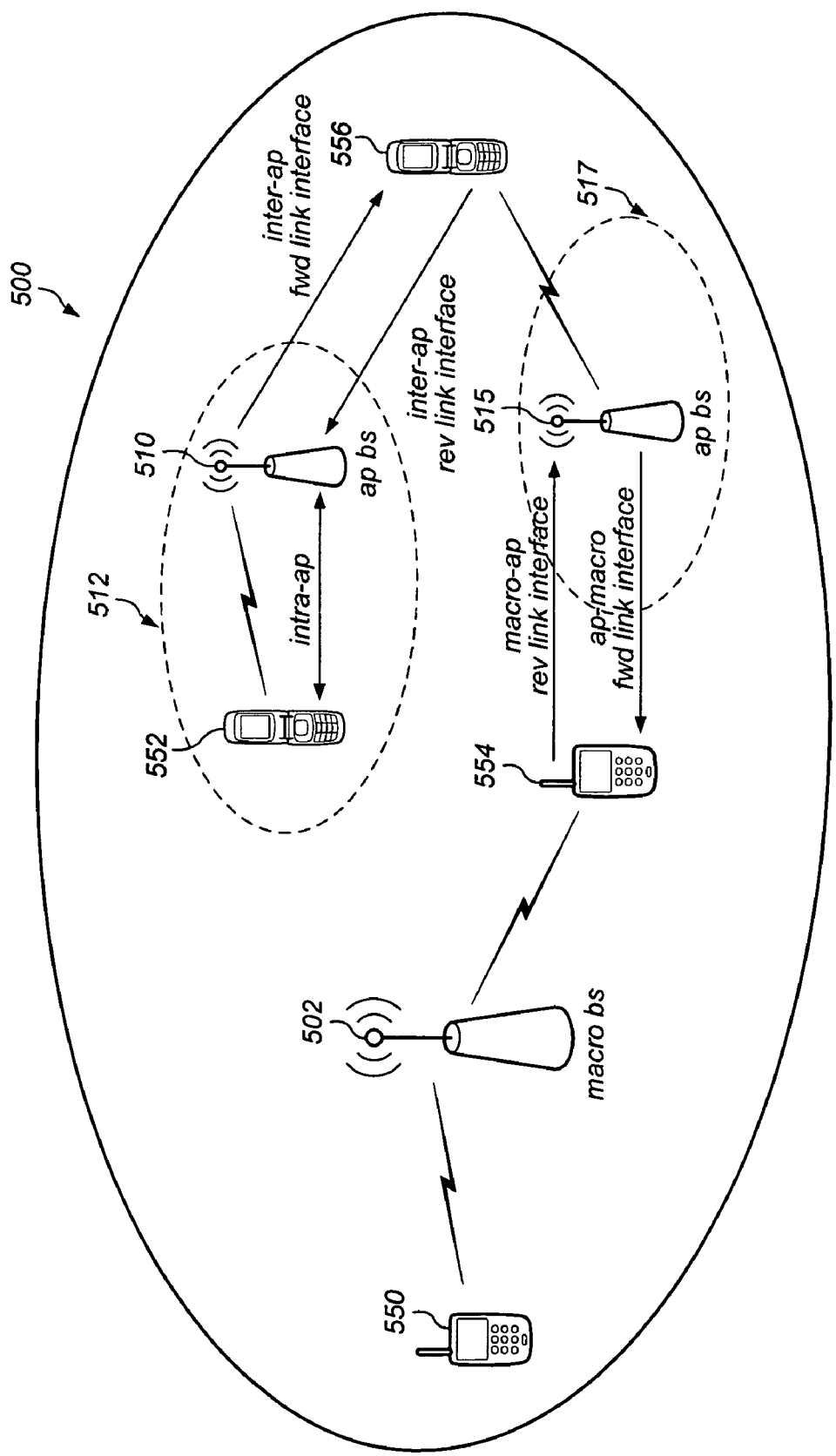
FIG. 5 is a diagram illustrating service areas for a macro base station and two access point base stations, according to one embodiment.

FIG. 5 also illustrates a macro base station 502 which provides service in a macro area 500 to access terminals within the macro area (such as, for example, access terminal 550). As shown, two access point base stations 510 and 515 may provide service in local areas 512 and 517. More specifically, access point base station (ap bs) 510 may provide service for access terminal 552. As also indicated, there may be macro-ap reverse and forward link interference for access terminal 554 between the macro base station 502 and the access point base station 515 as well as inter-ap forward and reverse link interference for access terminal 556 between the access point base stations 510 and 515. These interferences may be mitigated or managed according to various power, handoff, and hysterises parameters, described in more detail below.

In 304, the access point base station may send a message or otherwise request automatic provisioning of the access point base station from a wireless service provider. The message (and possibly other messages described below) may be defined as a new set of classes in the SNMP, CORBA, and XML models and may be administered over network management protocols, such as OAM, among other possibilities. In some embodiments, the access point base station may send the message over an IP network, e.g., provided by the broadband communications device. Alternatively (or possibly if the broadband communications device is not currently providing a network connection), the access point base station may send the message over the wireless network of the service provider, e.g., using a neighboring macro base station or possibly another access point base station.

In 306, the access point base station may receive identity information from the service provider. The identity information may uniquely identify the access point base station in the network of the service provider, and may be used in requests between the service provider and the access point base station.

In 308, the access point base station may transmit first information to the service provider, e.g., in one or more messages, possibly including an activation request message (ARM). The first information may be primarily provided over the IP network, e.g., provided by the broadband communications device. However, similar to descriptions above, the first information may be provided via the macro base station of the service provider, e.g., when the IP network is unavailable. The first information may include identity information and/or a plurality of parameters which describe various aspects of the access point base station. For example, the plurality of parameters may indicate location information, environmental information, capability information, and/or other information related to the access point base station. The first information may further includes at least one measurement of signals received by the access point base station from the macro base station, which will be provided to the service provider as a key factor of determining the access base station coverage area.

More specifically, the first information may include the location information of the access point base station, e.g., in terms of latitude and longitude, among other possibilities. The location information may be determined by the service provider and/or the access point base station, e.g., using standard network assisted location procedures. In some embodiments, the access point base station may determine its location information by communicating with a neighboring macro base station (or a plurality of neighboring base stations), e.g., by determining offset information and the location of the neighboring base station(s). Alternatively, in one embodiment, a GPS receiver may be used to provide the location information (e.g., coupled to or comprised in the access point base station).

As indicated above, the first information may further include capability information such as supported RAT technologies, maximum number of users and data rates, cell coverage characteristics (e.g., to allow maximum power allocation), etc. The capability information may include propagation characteristics of the environment in which the access point based station is located; however, this information may also or instead be provided in the environmental information parameters. One or more portions of the first information (e.g., environmental characteristics, location information, offset information, etc.) may be determined using a mobile station transceiver of the access point base station.

In 310, the access point base station may receive an assignment message followed with second information from the service provider (e.g., over the IP network) which includes information and/or one or more operational parameters. In 310 the access point base station may receive the second information (including the operational parameters) and store the operational parameters in the appropriate memory location in the base station such that these parameters may be accessed and used by software executing on the base station. Thus, receipt and storage of the operational parameters may automatically provision or configure the access point base station without any direct or manual user input required (other than connecting the base station to power and a broadband connection).

The second information may be determined (by the service provider) based on the first information (e.g., measurement information, location information, signal measurement and/or other information) provided by the access point base station. The operational parameters may include hand off parameters for handling handoffs of access terminals between the access point base station and the macro cell base station. In one embodiment, the second information may include an access point base station frequency or channel(s) assignment, a network SID and/or NID, and/or the identification of the access point base station, among others. The second information may include a PN offset (for cdma2000 protocols) and/or a cell scrambling code (for UTMS). The PN offset and/or cell scrambling code may be based on the location of the access point base station and may be used to manage the interference of the access point base station to the surrounding network.

The second information may include a neighbor list, which may include a list of neighboring macro base stations and/or other access point base stations. As indicated above, the second information may include PN offsets (e.g., long and/or short PN offsets) or scrambling code(s) for UMTS. These may be used to aid in the interference management of the access point base station. In some embodiments, the neighbor list may be updated whenever the neighbor list changes and/or at various periodic time intervals. The second information may include a maximum (transmit) power parameter which may be used to control the interference of the access point base station to the surrounding network (e.g., macro base stations or other access point base stations which may be indicated in the neighbor list). The maximum power parameter(s) may be determined based on the desired coverage area of the access point base station as well as the desired quality of service (e.g., for the user's home). The power parameter(s) may also be determined based on household propagation models, measurements of signals of the access point base station's neighboring base stations (macro or otherwise), and/or other factors. Additional parameters may include overhead channels power allocation (e.g., PiCH for the 1xRTT), etc.

The second information may further include handoff offsets or parameters related to handoffs, which may indicate macro to access point base station drop threshold(s) and/or access point base station to macro drop threshold(s). For example, the second information may provide handoff offset (HO) thresholds and hysteresis information, e.g., to facilitate handoff regardless of the access point base station within the macro coverage area.

The HO thresholds may comprise handoff parameters, such as macro to access point base station (or femto) drop threshold "$MSFDT_{DROP}$" and access point base station to macro drop threshold "$F2FDT_{DROP}$", among others. The $MSFDT_{DROP}$ parameter may specify a signal strength ratio used to determine when to perform a handoff from the macro base station to the access point base station when an access terminal is moving from the macro area (service being provided by the macro base station) to the local area. Conversely, the $F2FDT_{DROP}$ parameter may specify a signal strength ratio used to determine when to perform a handoff from the access point base station to the macro base station when an access terminal is moving from the local area (service being provided by the access point base station) to the macro area.

The hysteresis information may comprise one or more parameters that indicate a history of which of the macro base station or the access point base station has most recently provided service to the access terminal. In one embodiment, a positive (e.g., in dB) value of $MSFDT_{DROP}$ parameter provides a hysteresis during the macro-to-femto HO, while a negative value of $F2FDT_{DROP}$ provides hysteresis during the femto-to-macro HO. Those hysteresis may protect against frequent switching (ping-pong), between macro and femto service.

In one embodiment, the parameters may relate to optimal HO completion time or thresholds related to the time of HO completion. The HO parameters may help secure seamless HOs to/from other base stations, help reduce interference to the remaining users and/or surrounding network, and/or improve system capacity and overall quality of service by reducing the number of active code channels. These operational parameters/information (and possibly other parameters) may be semi-static and valid until the next message is sent from the service provider and/or until other changes in the location, environment, and/or user settings (among others) of the access point base station. Further descriptions regarding hand offs between the access point base station and a neighboring base station are provided in further flowcharts below.

The second information may further include additional parameters such as access point base station time re-sync (which may be sent by the network upon a loss of link(s) synchronization with the neighbor network), channels assignments (CAM messages which may be used to aid in the interference mitigation management of the access point base station). In some embodiments, the second information (and more particularly the operational parameters) may be determined using a coverage area propagation model. For example, this determination among others of the information and operational parameters may be performed or determined by one or more servers of the service provider.

The coverage area propagation model may include a series of typical residence/office layouts including such parameters as: type—destand alone/attached/apartment; area, number of rooms and levels; construction type—concrete, wood, cardboard, etc. Those typical layouts may be included in an installation SW (disc). Various procedures and the parameters (area, construction type, etc) may be entered by the user (or detected or located in a database), e.g., upon installation of the femtocell, and then sent in a message (such as the ARM message described herein) to the service provider. When the message is received, that information may be mapped into propagation models maintained by the service provider to derive, for example, the AP maximum transmit power. The variance between the typical and the actual residence layout and the actual location of the access terminal within the residence may be covered by the range of $MSFDT_{DROP}$ and $F2FDT_{DROP}$ parameters.

In 312, the access point base station may operate based on the second information, e.g., the one or more operational parameters of the second information. Operating according to the parameters may provide reduced interference caused by the access point base station (e.g., in the operation of neighboring macro or femto cells), and may allow for efficient handoffs between the access point base station and other base stations in the area (further descriptions provided below). Thus, the access point base station may be automatically configured or provisioned without requiring the user to manually configure the access point base station, which typically requires a level of expertise greater than that of average users.

In 314, in response to a change in the network, the access point base station may receive updated operational parameters from the service provider (e.g., automatically). Changes may include addition or removal of access point base stations, increases or decreases in load in the network (e.g., causing the service provider to change various parameters to perform load balancing in the area), changes in environmental conditions, detection of certain types of packages or messages in the network, loss or decrease of power to various base stations, and/or any other changes which may affect the parameters of the access point base station.

In some embodiments, the change may be initially determined by the access point base station and reported to the service provider before receiving the updated operational parameters. However, in some embodiments, the service provider may provide the updated parameters without first receiving a message from the access point base station. For example, as indicated above, a new access point base station may have been added to the area, and in response to provisioning of the new access point base station, operational parameters of the access point base station may need to be changed, e.g., as determined by the service provider. Accordingly, the access point base station may operate based on the updated operational parameters, which may reduce interference caused by the access point base station in the changed network. The updated parameters may also allow for more efficient handoffs in the changed network.

Additionally, during operation, all overhead messages (such as PCH, etc.) may be rebroadcast in the access point base station coverage area to provide reliable delivery of pages during Idle HO. Furthermore, each time a new user and/or a new resource is added to the existing users (e.g., defined with the Channel Assignments Messages), the assignment may be indicated (e.g., sent over the OAM interface or over the air) to the access point base station to aid in interference mitigation.

Note that various ones of the method elements described above (more specifically, 304, 306, 308, 310, and/or 312) may be performed automatically. As used herein, the term "automatically" is used to mean that the actions are not performed by a user. For example, in the descriptions above, a user may simply instruct the access point base station to begin a provisioning procedure to set up the access point base station and the method elements described above may be performed without any further user input specifying the steps. Alternatively, the access point base station may automatically begin the set up as soon as the access point base station is installed or otherwise coupled to the wide area network (e.g., the Internet). Thus, in this embodiment, the user may not provide any input during the provisioning of the access point base station. However, it should be noted that there may be embodiments where user input is required or requested during the automatic process (e.g., confirmation of steps or requests for certain user parameters).

FIGS. 6-9—Method for Performing Handoffs with an Access Point Base Station

FIGS. 6-9 illustrate an exemplary method for performing handoffs with an access point base station. The method shown in these Figures may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

The described handoff methods may be immune to frequent switches between the macro and access point base station environments (e.g., because the access point base station may be deployed anywhere within the macro coverage area. For the cdma2000-1xRTT protocol, handoffs between the macro and access point base station environments may be controlled by existing procedures specified in CDMA Tiered Services (User Zone Identification Messages, Private Neighbor List, Feature Notification Message, Flash With Information Message), the access point base station access policy status or mode, the content of the preferred terminal list, and handoff request messages. Similarly, for the EV-DO or UMTS systems, the handoff between the macro and access point base station environments may be controlled by the access point base station access policy, content of the preferred terminals list, and handoff requests messages.

Figure 6:
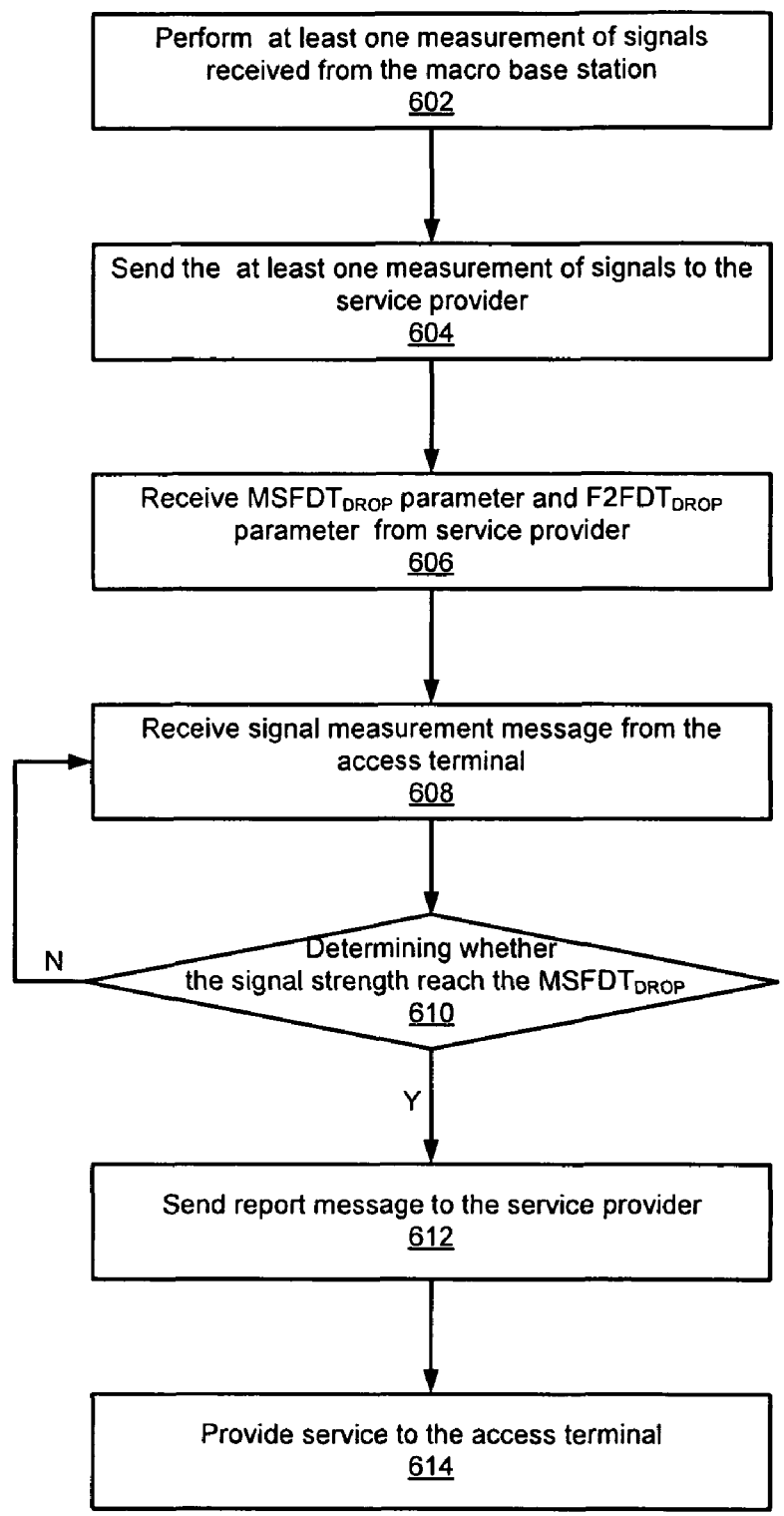
FIG. 6 is a flowchart of an exemplary method for performing a handoff between a macro base station and an access point base station, according to one embodiment.

In 602-606 of FIG. 6, the access point base station may be configured, e.g., according to the method described in FIG. 3. In 602, the access point base station performs at least one measurement of signals received from the macro base station, and sends the measurement to the service provider (in 604). In 604, the access point base station may receive HO parameters, such as macro to access point base station (or femto) drop threshold "$MSFDT_{DROP}$" and access point base station to macro drop threshold "$F2FDT_{DROP}$", one or more hysteresis parameters, etc. from the service provider. Actually, the HO parameters may be established for the access point base station during configuration or other times (e.g., after network or environmental changes) by the service provider.

In 608, when the access terminal moves from the macro-to-access point base station, the access point base station may perform measurement of signals received from the access terminal. In the embodiment of FIG. 5, the access terminal may be currently given wireless services of the service provider by a neighboring base station, such as a macro cell base station. The access terminal may be within the coverage area of the access point base station or may be at least close enough that the access point base station may begin measuring or receiving signals from the access terminal. In some embodiments, the access terminal may be an access terminal defined on the preferred terminals list of the access point base station, or may be an access terminal that is eligible to receive access or services from the access point base station, e.g., according to the admission policy information of the access point base station.

In some embodiments, performing at least one measurement of signals received by the access terminal may include the access terminal detecting the access point base station and reporting signal strengths received by the access terminal to the access point base station. In some embodiments, the access terminal may measure the signal strength of any base station it can communicate with/detect, and broadcast a message indicating the detected base stations and/or their signal strengths by signal measurement messages.

Figure 7:
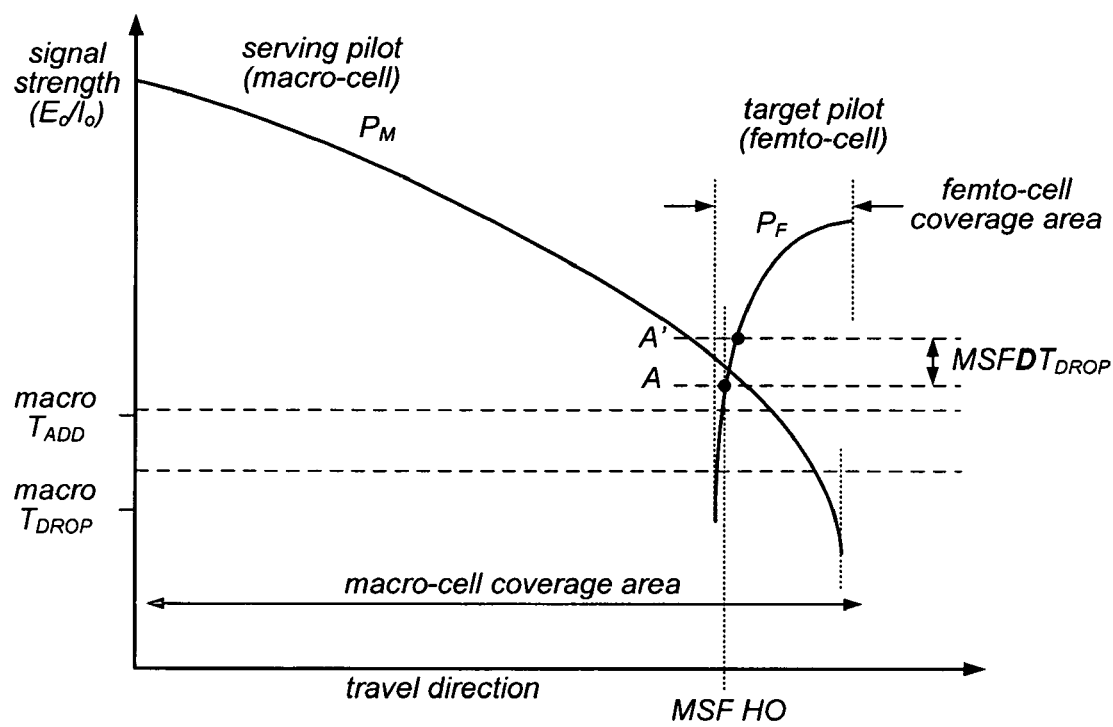
FIG. 7 is a graph corresponding to the method of FIG. 7, according to one embodiment.

More specifically, in cdma2000-1xRTT systems, when the access terminal detects the access point base station, it may send the PSMM message. After receiving a channel assignment message (CAM), both cell forward links may be in the soft hand off (SHO). The access terminal may remain in the SHO until the access point base station signal strength ratio specified by the macro to access point base station drop threshold ($MSFDT_{DROP}$) is reached. The $MSFDT_{DROP}$ parameter is shown in FIG. 7 with respect to the coverage areas of the macro-cell and the access point base station. In this case, the M2FT drop parameter is indicated with dotted lines and occurs near the crossing of signal strengths (of the macro cell and the access point base station). Thus, the $MSFDT_{DROP}$ parameter is used to indicate when handoffs should occur when an access terminal is handed off between a macro cell (or macro base station) and an access point base station. Note that the $MSFDT_{DROP}$ parameter may assume a positive (dB) value in order to control the handoff and interference area. A '0' value may effectively disable handoffs.

Similarly, for EV-DO or UMTS systems, when the access terminal detects the access point base station, it may send a cell measurement message, e.g., to the access point base station. Similar to above, the access point base station may wait until MSFDTDROP threshold is reached to determine the HO completion.

In 610, the access point base station may determine whether the signal strength is reached the signal strength specified by the $MSFDT_{DROP}$. If the HO threshold is reached ($MSFDT_{DROP}$), the access point base station may send a handoff request or handoff report to the service provider (in 612), otherwise, go back to 610.

In 614, in response to the handoff request message, the macro cell base station may be removed from the access terminal's active set, and the access point base station may provide service to this access terminal. Removal of the macro cell base station from the access terminal active set may be performed by (or at the request of) the service provider and/or the access point base station, as desired. The active set of the access terminal may determine which base station the access terminal uses for network access. In this case, the macro base station may cease providing service to this terminal which may continue using the access point base station, thereby completing the handoff from the macro base station to the access point base station.

Note that while the above described handoff procedure is facilitated largely by the access point base station, it is envisioned that the handoff procedure may also be managed by other devices or servers, e.g., by the service provider itself, such as, for example, a network controller of the service provider. Thus, FIG. 5 describes a handoff procedure for transferring provision of services to an access terminal from a macro base station to an access point base station. It should be noted that similar procedures may be used to perform handoffs between different access point base stations and/or other handoffs.

Figure 8:
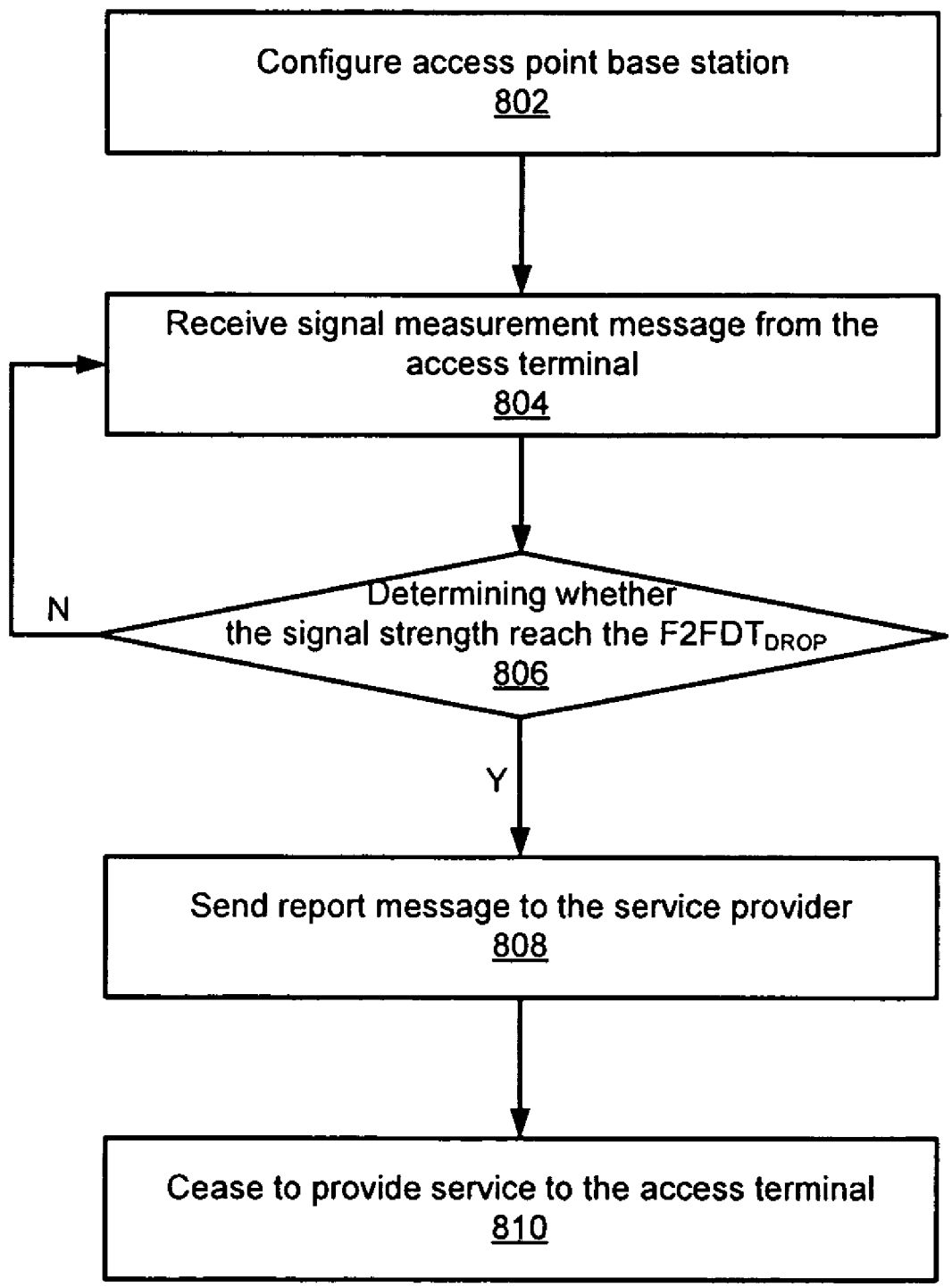
FIG. 8 is a flowchart of an exemplary method for performing a handoff between an access point base station and a macro base station, according to one embodiment.

In 802 of FIG. 8, the access point base station may be configured, e.g., according to the method described in FIG. 6. As indicated above, handoff parameters, such as macro to access point base station (or femto) drop threshold "$MSFDT_{DROP}$" and access point base station to macro drop threshold "$F2FDT_{DROP}$", may be established for the access point base station during configuration or other times (e.g., after network or environmental changes) by the service provider.

Figure 9:
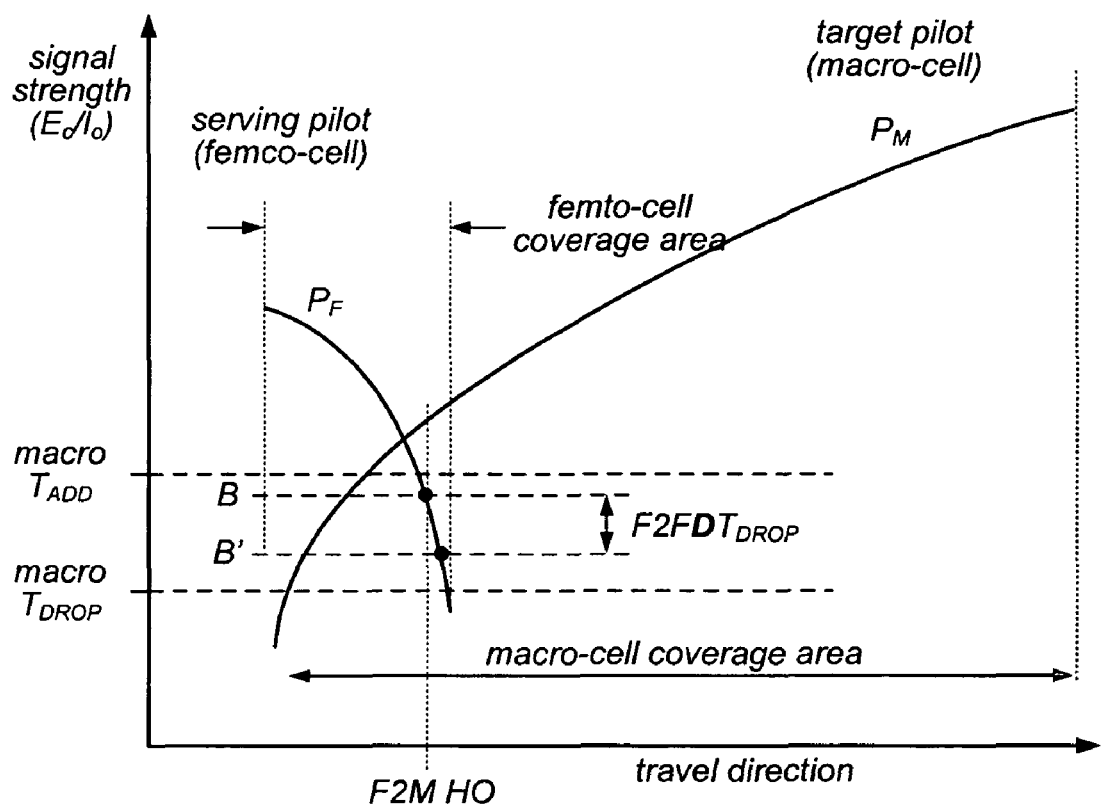
FIG. 9 is a graph corresponding to the method of FIG. 9, according to one embodiment.

In 804, when the access terminal moves from the macro-to-access point base station, the access point base station may receive at least one measurement of signals received by at least one access terminal. In the embodiment of FIG. 9, the access terminal may be currently given wireless services of the service provider by the access point base station. The access terminal may be within the coverage area of a neighboring macro base station or may be at least close enough that the macro base station may be able to begin servicing the access terminal.

In some embodiments, performing at least one measurement of signals received by the access terminal may include the access terminal detecting the macro base station and/or reporting signal strengths received by the access terminal to the access point base station. For example, in one embodiment, when the access terminal receives a signal from the macro base station at a strength above a specific threshold (e.g., a terminal add or TADD threshold), the access terminal may report its strength in PSSM, RUM, or cell strength measurement messages.

More specifically, in cdma2000-1xRTT systems, when the access terminal detects the macro base station, it may send the PSMM message. After receiving a channel assignment message (CAM), the access point base station may be added to this access terminal active set and, at this point, both cell forward links may be in the soft hand off (SHO). The access terminal may remain in the SHO until the macro base station signal strength ratio specified by the access point base station to macro drop threshold ($F2FDT_{DROP}$) is reached. The $F2FDT_{DROP}$ parameter is shown in FIG. 9 with respect to the coverage areas of the macro cell and the access point base station (femtocell). In this case, the $F2FDT_{DROP}$ parameter is indicated with dotted lines and occurs near the crossing of signal strengths (of the macro cell and the access point base station). Thus, the $F2FDT_{DROP}$ parameter is used to indicate when handoffs should occur when an access terminal is handed off between an access point base station and a macro base station. Note that the $F2FDT_{DROP}$ parameter may assume a negative (dB) value in order to control the handoff and interference area. A '0' value may effectively disable handoffs.

Similarly, for EV-DO or UMTS systems, when the access terminal detects the macro base station, it may send a cell measurement message, e.g., to the access point base station. Similar to above, the access point base station may wait until $F2FDT_{DROP}$ threshold is reached.

In 806, the access point base station may determine whether the signal strength is reached the signal strength specified by the F2FDT$_{DROP}$. If the HO threshold is reached (F2FDT$_{DROP}$), the access point base station may send a handoff request or handoff report to the service provider (in 808), otherwise, go back to 806.

In 810, in response to the handoff message, the access point base station may be removed from the access terminal's active set and the macro base station will provide service to the access terminal. Removal of the access point base station from the access terminal active set may be performed by (or at the request of) the service provider network control function and/or the access point base station, as desired. The active set of the access terminal may indicate which base station the access terminal may currently use for network access. In this case, the access terminal may cease to use the access point base station and may begin using the macro base station for wireless communication, thereby completing the handoff from access point base station to the macro base station.

Note that while the above described handoff procedure is managed largely by the access point base station, it is envisioned that the handoff procedure may also be managed by other devices or servers, e.g., by the network control function. Thus, FIG. 8 describes a handoff procedure for transferring provision of services to an access terminal from an access point base station to a macro base station. It should be noted that similar procedures may be used to perform handoffs between different access point base stations and/or other handoffs.

Figure 10:
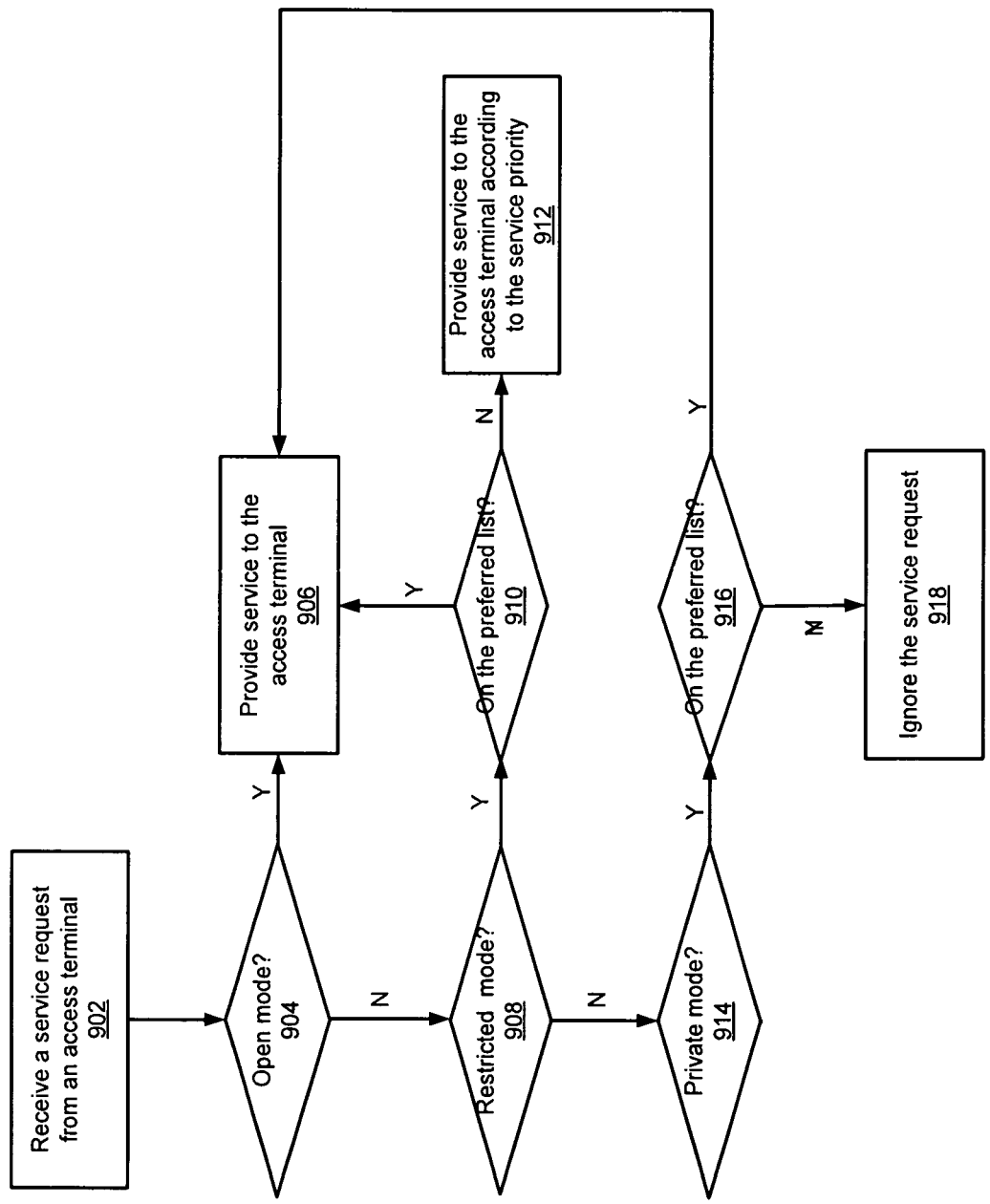
FIG. 10 is a flowchart of an exemplary method for illustrating admission policy according to one embodiment While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

FIG. 10—Method for Performing Admission Policy with an Access Point Base Station In one embodiments, the first information which is sent to the service provider during provisioning of an access point base station may include an access policy set. The access policy set may include a preferred terminal list and/or a service priority, for determining whether access terminals can use the access point base station or for assigning priority of access terminals for use of the access point base station. In some embodiments, the user may provide input (e.g., to a user interface of the access point base station) for specifying the access terminals of the preferred terminal list. Alternatively, or additionally, users may enter in a secret code, e.g., using their access terminal as an input device, to use (or get priority use of) the access point base station. In some embodiments, the owner or administrator of the access point base station may define a priority (e.g., using tiered rankings, explicit ordering, or other methods) among the access terminals in the list to define how the access point base station allots resources to those access terminals on the list. However, it should be noted that the preferred terminal list may not be provided by the access point base station during provisioning of the access point base station. For example, the preferred terminal list may be updated or provided by the access point base station at any time after provisioning, as desired.

Similarly, the access policy set may include an access policy mode. For example, the user may provide input of a desired access policy of the access point base station. In some embodiments, the access policy may have one or more of the following options: open (e.g., all access terminals may access the access point base station), restricted (e.g., all access terminals in the access terminal list are permitted unrestricted access where other access terminals have limited or no access), and/or private (e.g., only access terminals on the access terminal list are allowed to use the access point base station). Similar to above, this information may or may not be provided during provisioning and may be provided or changed at any later point as desired. However, in some embodiments, the user may not be able to control the access policy of the access point base station; instead the service provider may ultimately assign the policy. Thus, various types of information may be provided to the service provider in the first information.

Correspondingly, the second information sent by the service provider will include admission policy information for controlling operating of the access point base station. The admission policy information may include an admission policy mode parameter, which, as indicated above, may allow for open, restricted, or private access to the access point base station resources. Furthermore, the second information may include a preferred terminal list, which, as also indicated above, may be used to manage service priority for access terminals. For example, in a private mode, the access point base station may restrict access only to those access terminals on the list, where for a semi-open policy, the listed access terminals may be given service while all other access terminals may be given service according to the service priority. The admission policy mode and/or preferred terminal list may be determined based on the owner's service agreement, the location of the access point base station, the subscriptions of other customers near the location of the access point base station, the admission policy mode and/or a preferred terminal list provided by the access point base station (e.g., as provided by the user), the neighbor list, and/or other information.

FIG. 10 illustrates an exemplary method for performing admission policy with an access point base station. In 902, the access point base station may receive a service request from an access terminal, for example, when the access terminal is moved from a macro base station to a position closely to the access point base station. In 904, the access point base station determines whether the current admission policy mode is in open. If the admission policy mode in open, then provide service to the access terminal (in 906). If not in the open mode, determine whether the access point base station is in a restricted mode (in 908). If in the restricted mode, further determine whether the access terminal is on the preferred list (in 910). As mentioned above, the listed access terminal will be given unrestricted service (in 906), and the unlisted access terminal will be given service according to the service priority (in 912). If not in the restricted mode (N of step 908), determine whether the access point base station is in a private mode (in 914). If in the private mode, determine whether the access terminal is in the preferred list (916). the listed access terminal will be given service while service request from unlisted access terminal will be ignored.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing automatic provisioning of an access point base station, the method comprising:
   transmitting first information to a service provider, wherein the first information comprises location information of the access point base station and capability information of the access point base station;
   receiving second information from the service provider, wherein the second information comprises one or more operational parameters, wherein the second information is determined at least in part based on the first information; and
   operating based on the one or more operational parameters.
2. The method of claim 1,
   wherein the capability information comprises propagation characteristics of the environment in which the access point base station is located.

3. The method of claim 1,
wherein said operating based on the one or more operational parameters provides reduced interference caused by the access point base station.

4. The method of claim 1,
wherein the access point base station provides wireless communication in a local area, wherein a macro base station provides wireless communication in a macro area intersected partially with the local area, and wherein said operating based on the one or more operational parameters provides more efficient handoffs between the macro base station and the access point base station.

5. The method of claim 1,
wherein the one or more operational parameters are determined based on a coverage area propagation model.

6. The method of claim 1, wherein the access point base station provides wireless communication in a local area, wherein a macro base station provides wireless communication in a macro area intersected partially with the local area, and wherein the method further comprises:
performing at least one measurement of signals received by the access point base station from the macro base station;
wherein the first information comprises the at least one measurement.

7. The method of claim 1,
in response to a change in the network:
receiving updated operational parameters from the service provider;
operating based on the updated operational parameters, wherein said operating based on the updated operational parameters reduces interference caused by the access point base station in the changed network and provides more efficient handoffs in the changed network.

8. The method of claim 1,
wherein the access point base station is a femtocell connecting to the service provider via a wired connection.

9. A femtocell, comprising:
an interface for providing communication with one or more access terminals in a local area and communication with a service provider over a wired network;
a processor coupled to the interface;
a memory medium coupled to the processor, wherein the memory medium comprises program instructions executable to:
connect to the service provider using the interface;
transmit first information to the service provider, wherein the first information comprises location information of the femtocell and capability information of the femtocell;
receive second information from the service provider, wherein the second information comprises one or more operational parameters, wherein the second information is determined at least in part based on the first information; and
operate the femtocell based on the one or more operational parameters.

10. The femtocell of claim 9,
wherein the capability information comprises propagation characteristics of the environment in which the femtocell is located.

11. The femtocell of claim 9,
wherein said operating based on the one or more operational parameters provides reduced interference caused by the femtocell.

12. The femtocell of claim 9,
wherein a macro base station provides wireless communication in a macro area intersected partially with the local area, and wherein said operating based on the one or more operational parameters provides more efficient handoffs between the macro base station and the femtocell.

13. The femtocell of claim 9,
wherein the one or more operational parameters are determined based on a coverage area propagation model.

14. The femtocell of claim 9, wherein a macro base station provides wireless communication in a macro area intersected partially with the local area, and wherein the program instructions are further executable to:
perform at least one measurement of signals received by the femtocell from the one or more access terminals;
wherein the first information comprises the at least one measurement.

15. The femtocell of claim 9, wherein the program instructions are further executable to:
in response to a change in the network:
receive updated operational parameters from the service provider;
operate based on the updated operational parameters, wherein said operating based on the updated operational parameters reduces interference caused by the femtocell in the changed network and provides more efficient handoffs in the changed network.

16. A computer accessible memory storing program instructions for operating an access point base station, wherein the program instructions are executable to:
connect to the service provider using an interface;
transmit first information to the service provider, wherein the first information comprises location information of the access point base station and capability information of the access point base station;
receive second information from the service provider, wherein the second information comprises one or more operational parameters, wherein the second information is determined at least in part based on the first information;
operate the point base station based on the one or more operational parameters.

17. The memory of claim 16,
wherein the capability information comprises propagation characteristics of the environment in which the access point base station is located.

18. The memory of claim 16,
wherein said operating based on the one or more operational parameters provides reduced interference caused by the access point base station.

19. The memory of claim 16, wherein the program instructions are further executable to:
in response to a change in the network:
receive updated operational parameters from the service provider;
operate the access point base station based on the updated operational parameters, wherein said operating based on the updated operational parameters reduces interference caused by the point base station in the changed network and provides more efficient handoffs in the changed network.

20. A method for performing automatic provisioning of an access point base station, the method comprising:
connecting to an access point base station through a wired connection, wherein the access point base station provides wireless communication in a local area;

receiving first information from the access point base station, wherein the first information comprises location information of the access point base station and capability information of the access point base station; and transmitting second information to the access point base station based on the first information, wherein the second information comprises one or more operational parameters for the access point base station, wherein the second information is determined at least in part based on the first information;

wherein the one or more operational parameters are useable to configure the access point base station.

21. A communication system for providing wireless communication with one or more access terminals, comprising:

a service provider;

a macro base station for providing wireless communication with the one or more access terminals in a macro area; and an access point base station for providing wireless communication with the one or more access terminals in a local area intersected partially with the macro area, and wherein the access point base station is configured to:

connect to the service provider;

transmit first information to the service provider, wherein the first information comprises location information of the access point base station and capability information of the access point base station;

receive second information from the service provider, wherein the second information comprises one or more operational parameters, wherein the second information is determined at least in part based on the first information; and operate based on the one or more operational parameters.

* * * * *